United States Patent
Fan et al.

(10) Patent No.: US 12,440,983 B1
(45) Date of Patent: Oct. 14, 2025

(54) LEARNING-EMBEDDED MOTION PLANNING

(71) Applicant: Anyware Robotics Inc., Fremont, CA (US)

(72) Inventors: Yongxiang Fan, Palo Alto, CA (US); Te Tang, Fremont, CA (US); Yiyang Zhou, Hayward, CA (US)

(73) Assignee: Anyware Robotics Inc., Fremont, CA (US)

( * ) Notice: Subject to any disclaimer, the term of this patent is extended or adjusted under 35 U.S.C. 154(b) by 141 days.

(21) Appl. No.: 18/429,763

(22) Filed: Feb. 1, 2024

Related U.S. Application Data

(60) Provisional application No. 62/430,042, filed on Dec. 4, 2022.

(51) Int. Cl.
*B25J 9/16* (2006.01)
*B25J 19/02* (2006.01)

(52) U.S. Cl.
CPC .......... *B25J 9/1664* (2013.01); *B25J 9/161* (2013.01); *B25J 9/162* (2013.01); *B25J 9/163* (2013.01); *B25J 9/1671* (2013.01); *B25J 19/023* (2013.01)

(58) Field of Classification Search
CPC . B25J 9/1664; B25J 9/161; B25J 9/162; B25J 9/163; B25J 9/1671; B25J 19/02
See application file for complete search history.

(56) References Cited

U.S. PATENT DOCUMENTS

| | | | | |
|---|---|---|---|---|
| 7,801,644 | B2* | 9/2010 | Bruemmer | G06N 3/008 318/568.17 |
| 8,244,402 | B2* | 8/2012 | Wells | H04N 23/90 318/568.13 |
| 8,272,278 | B2* | 9/2012 | Loeb | G01L 5/228 374/45 |
| 8,410,441 | B2* | 4/2013 | Stratmann | H04N 23/63 250/330 |
| 8,447,863 | B1* | 5/2013 | Francis, Jr. | G06F 16/2468 709/227 |

(Continued)

OTHER PUBLICATIONS

Elbanhawi, "Sampling-Based Robot Motion Planning: A Review", IEEE, Feb. 4, 2014, vol. 2, pp. 56-77.

(Continued)

*Primary Examiner* — Bhavesh V Amin
(74) *Attorney, Agent, or Firm* — WILSON SONSINI GOODRICH & ROSATI

(57) ABSTRACT

Method of sequential handling of a plurality of freight units by an end effector of a robotic system comprises training a neural network operable to bias a plurality of samples of a configuration space of the end effector. Deployment of the trained neural network involves sensing an arrangement of freight units in a scene based on an image of the scene from a sensor. A freight unit is chosen based on the at least one trained neural network. A starting pose of the robotic end effector as a means to pick the chosen freight unit is chosen; and a goal pose of the robotic end effector is chosen as a means to place the chosen freight unit. A motion of the robotic end effector is planned from the starting pose to the goal pose based on a biased plurality of samples. Then motion on the end effector is controlled based on the planning.

16 Claims, 8 Drawing Sheets

(56) References Cited

U.S. PATENT DOCUMENTS

| | | | | |
|---|---|---|---|---|
| 8,452,451 | B1* | 5/2013 | Francis, Jr. | B25J 9/1658 |
| | | | | 700/258 |
| 8,639,644 | B1* | 1/2014 | Hickman | G05B 19/042 |
| | | | | 706/14 |
| 8,941,726 | B2* | 1/2015 | Marks | G06T 7/11 |
| | | | | 382/152 |
| 9,095,978 | B2* | 8/2015 | Shi | B25J 9/0096 |
| 9,616,568 | B1* | 4/2017 | Russell | B25J 19/02 |
| 9,875,427 | B2* | 1/2018 | Medasani | G06V 10/462 |
| 9,914,213 | B2* | 3/2018 | Vijayanarasimhan | |
| | | | | G06N 3/045 |
| 10,207,402 | B2* | 2/2019 | Levine | B25J 9/161 |
| 10,354,139 | B1* | 7/2019 | Li | G06V 10/764 |
| 10,507,583 | B2* | 12/2019 | Wang | B25J 9/1697 |
| 10,682,774 | B2* | 6/2020 | Bingham | B25J 15/0004 |
| 10,792,809 | B2* | 10/2020 | Bingham | B25J 15/022 |
| 10,853,646 | B1* | 12/2020 | Li | G06V 10/764 |
| 10,926,952 | B1* | 2/2021 | Shi | G06N 3/08 |
| 11,195,024 | B1* | 12/2021 | Fan | G06V 20/46 |
| 11,240,441 | B2* | 2/2022 | Naruse | G06N 20/00 |
| 11,338,435 | B2* | 5/2022 | Ishikawa | B25J 9/163 |
| 11,625,422 | B2* | 4/2023 | Sizemore | G06F 16/3344 |
| | | | | 707/741 |
| 11,651,497 | B2* | 5/2023 | Cherian | G06T 7/50 |
| | | | | 382/173 |
| 11,787,059 | B2* | 10/2023 | Toris | B25J 9/1612 |
| | | | | 700/245 |
| 11,813,758 | B2* | 11/2023 | Chavez | B25J 9/1692 |
| 11,833,661 | B2* | 12/2023 | Xu | B25J 9/163 |
| 11,911,919 | B2* | 2/2024 | Moreira Rodrigues | |
| | | | | B25J 9/1697 |
| 11,919,161 | B2* | 3/2024 | Fan | B25J 9/1612 |
| 11,986,955 | B2* | 5/2024 | Agarwal | B25J 9/1697 |
| 12,030,191 | B2* | 7/2024 | Shao | B25J 9/1666 |
| 12,039,742 | B2* | 7/2024 | Lin | G06T 7/246 |
| 12,240,713 | B2* | 3/2025 | Moreno | B25J 13/08 |
| 12,358,147 | B2* | 7/2025 | Homberg | B25J 9/1697 |
| 2008/0133058 | A1* | 6/2008 | Ohno | B25J 9/1612 |
| | | | | 901/31 |
| 2011/0071675 | A1* | 3/2011 | Wells | H04N 13/204 |
| | | | | 700/250 |
| 2011/0141251 | A1* | 6/2011 | Marks | G06T 7/11 |
| | | | | 348/222.1 |
| 2013/0006423 | A1* | 1/2013 | Ito | B25J 9/1612 |
| | | | | 901/46 |
| 2013/0166061 | A1* | 6/2013 | Yamamoto | B25J 9/1669 |
| | | | | 700/214 |
| 2013/0184860 | A1* | 7/2013 | Ota | B25J 9/1612 |
| | | | | 700/245 |
| 2014/0163731 | A1* | 6/2014 | Shi | B25J 9/0096 |
| | | | | 700/250 |
| 2014/0277742 | A1* | 9/2014 | Wells | B25J 9/1612 |
| | | | | 700/264 |
| 2015/0002391 | A1* | 1/2015 | Chen | H04N 23/56 |
| | | | | 345/156 |
| 2015/0003678 | A1* | 1/2015 | Watanabe | B25J 9/1697 |
| | | | | 382/103 |
| 2015/0273688 | A1* | 10/2015 | Harada | B25J 9/1612 |
| | | | | 700/259 |
| 2019/0287063 | A1* | 9/2019 | Skaaksrud | G06Q 10/0832 |
| 2019/0291277 | A1* | 9/2019 | Oleynik | B25J 9/1669 |
| 2020/0225673 | A1* | 7/2020 | Ebrahimi Afrouzi | |
| | | | | A47L 11/4011 |
| 2020/0316782 | A1* | 10/2020 | Chavez | B25J 9/1697 |
| 2020/0376678 | A1* | 12/2020 | Yano | G06V 20/10 |
| 2021/0031368 | A1* | 2/2021 | Drumwright | B25J 15/0038 |
| 2021/0053407 | A1* | 2/2021 | Smith | B25J 19/021 |
| 2021/0089040 | A1* | 3/2021 | Ebrahimi Afrouzi | |
| | | | | G05D 1/0248 |
| 2021/0129971 | A1* | 5/2021 | Brown, Jr. | G06T 7/0004 |
| 2022/0134546 | A1* | 5/2022 | Xu | B25J 13/085 |
| | | | | 700/250 |
| 2022/0288783 | A1* | 9/2022 | Sundermeyer | B25J 9/1669 |
| 2022/0291666 | A1* | 9/2022 | Cella | G06F 18/241 |
| 2022/0297958 | A1* | 9/2022 | Moreno | B25J 13/08 |
| 2023/0080545 | A1* | 3/2023 | Cella | G06Q 40/06 |
| | | | | 700/118 |
| 2023/0098602 | A1* | 3/2023 | Cella | B25J 9/1674 |
| | | | | 700/248 |
| 2023/0102048 | A1* | 3/2023 | Cella | B25J 9/1661 |
| | | | | 700/248 |
| 2023/0124599 | A1* | 4/2023 | Fan | G06V 20/647 |
| | | | | 700/259 |
| 2023/0176557 | A1* | 6/2023 | Cella | G05B 13/048 |
| | | | | 700/117 |
| 2023/0222454 | A1* | 7/2023 | Cella | G06N 7/01 |
| | | | | 705/28 |
| 2023/0234233 | A1* | 7/2023 | Goyal | G06T 7/269 |
| 2024/0066711 | A1* | 2/2024 | D'Amelio | B25J 9/0084 |
| 2024/0091951 | A1* | 3/2024 | Chavan Dafle | G06T 7/73 |
| 2024/0149460 | A1* | 5/2024 | Matl | B25J 9/1679 |
| 2024/0157561 | A1* | 5/2024 | D'Amelio | B25J 9/1687 |
| 2024/0157566 | A1* | 5/2024 | Yu | G06T 1/0014 |
| 2024/0308082 | A1* | 9/2024 | Konar | B25J 9/1664 |

OTHER PUBLICATIONS

Ichnowski et al., "GOMP: Grasp-Optimized Motion Planning for Bin Picking", 2020 IEEE International Conference on Robotics and Automation (ICRA), 2020, pp. 5270-5277.

Ichnowski et al., "Deep learning can accelerate grasp-optimized motion planning", Science Robotics, Nov. 18, 2020, vol. 5, pp. 1-12.

Ichter et al., "Learning Sampling Distributions for Robot Motion Planning", 2018 IEEE International Conference on Robotics and Automation (ICRA), 2018, pp. 70870-7094.

Ichter et al., "Robot Motion Planning in Learned Latent Spaces", IEEE Robotics and Automation Letters, Jul. 2019, vol. 4, No. 3, pp. 2407-2414.

Thakar et al., "Manipulator Motion Planning for Part Pickup and Transport Operations From a Moving Base", IEEE Transactions on Automation Science and Engineering, Jan. 2022, vol. 19, No. 1, pp. 191-206.

Thakar et al., "Towards Time-Optimal Trajectory Planning for Pick-and-Transport Operation with a Mobile Manipulator", 2018 IEEE 14th International Conference on Automation Science and Engineering (CASE), 2018, pp. 981-987.

Xiao et al., "Motion Planning and Control for Mobile Robot Navigation Using Machine Learning: a Survey", Feb. 26, 2022, pp. 1-32.

Zhou et al., "A review of motion planning algorithms for intelligent robots", Journal of Intelligent Manufacturing, 2022, vol. 33, pp. 387-424.

Zimmermann et al., "A multi-level optimization framework for simultaneous grasping and motion planning", pp. 1-7.

* cited by examiner

12,440,983 B1

LEARNING-EMBEDDED MOTION PLANNING

PRIORITY CLAIM

The present application claims priority to U.S. provisional patent application Ser. No. 63/430,042, filed Dec. 4, 2022, which is incorporated herein by reference in its entirety.

FIELD

This disclosure relates generally to the fields of motion planning and robotics.

BACKGROUND

Contemporary robotics systems extensive use of motion planning methods that are advantageously designed and implemented in various configurations for various purposes.

SUMMARY

In one general aspect, the present invention is directed to computer-implemented systems and methods with a learning-embedded motion planning technique for robot box pick and place operations. A learning module and a planning module are used to improve the motion planning speed and accuracy and extend to full degree-of-freedom (DOF) motion planning. The disclosed method can produce 6-DOF box pick-and-place motions efficiently and accurately. The disclosed technique separates the motion planning into an intuition learning module and a guided motion planning module. First, the intuition learning module is used to learn the best box to pick as well as generating sample distributions around the stacked boxes. Then, the narrow manifold planning module grows a rapidly-exploring random tree guided by the learned sampling distributions. The learning-embedded motion planning (including intuition learning and guided motion planning) can generate high-quality motions at a high speed to be used in real-time box handling applications.

In various embodiments, therefore, a system according to embodiments of the present invention comprises a first computer system for training a neural network operable to bias a plurality of samples of a configuration space of the end effector. Once the neural network is trained it can be deployed on the robotic system to perform the sequential handling of the freight units. The robotic system in that connection may comprise a sensor, a robot computer system, and the end effector. The sensor is for capturing an image of freight units in a scene. The robot computer system is configured to: sense an arrangement of the freight units in the scene based on the image; choose a freight unit based on the trained neural network; choose a starting pose of the robotic end effector as a means to pick the chosen freight unit; choose a goal pose of the robotic end effector as a means to place the chosen freight unit; plan a motion of the end effector from the starting pose to the goal pose; and control the motion on the robotic end effector based on the planning.

These and other benefits that can be realized through embodiments of the present invention will be apparent from the description that follows.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which.

DESCRIPTION OF EXAMPLE EMBODIMENTS

Overview

In part, in one aspect, the disclosure relates to a motion planning method for an end effector of a robotic system. In one aspect, the motion planning method comprises determining a physical path or a motion between a starting pose of a mobile or moveable robotic component or system and a goal pose of the robotic component or system. In one aspect, the end effector may be a robotic arm or other mobile/moveable robotic component operable to move in, for example, 6 degrees of freedom, to, as one example, pick and place boxes freight units, or other objects. For example, the robotic arm may pick boxes in a shipping container and place them on a conveyor belt or pallet to unload the boxes from the shipping container or vice versa (load the shipping container with boxes from the conveyor belt or pallet, for example). A starting pose of the robotic end effector may comprise the picking of a box or freight unit, the goal pose of the robotic end effector may comprise the placing of a box or freight unit in a desired location, such as on the conveyor belt or pallet. In part, the motion planning method disclosed herein may plan a path from a starting pose to a goal pose such that obstacles or obstructions in an environment (e.g., in the shipping container) are avoided.

EXAMPLE EMBODIMENTS

In many embodiments of the current disclosure, a scene comprises a collection of boxes, freight units, or other objects in an arbitrary configuration, such as, but not limited to a shipping container for rail, truck or cargo ship use. Various obstacles or obstructions are also present in the scene. In various embodiments, a robotic end effector, such as a robotic arm or other moveable and manipulatable robotic component is operable to pick and place boxes, freight units, or other objects participates in a sequential handling of the boxes while avoiding the obstacles in the scene. In some embodiments, sequential handling of the boxes comprises a loading or unloading, from the initial arbitrary configuration, of the boxes onto or off a pallet or conveyor belt, for example, by the robotic system. In other embodiments, the sequential handling comprises a loading or unloading of the boxes onto or off a truck, vehicle, or other container.

Figure 1:
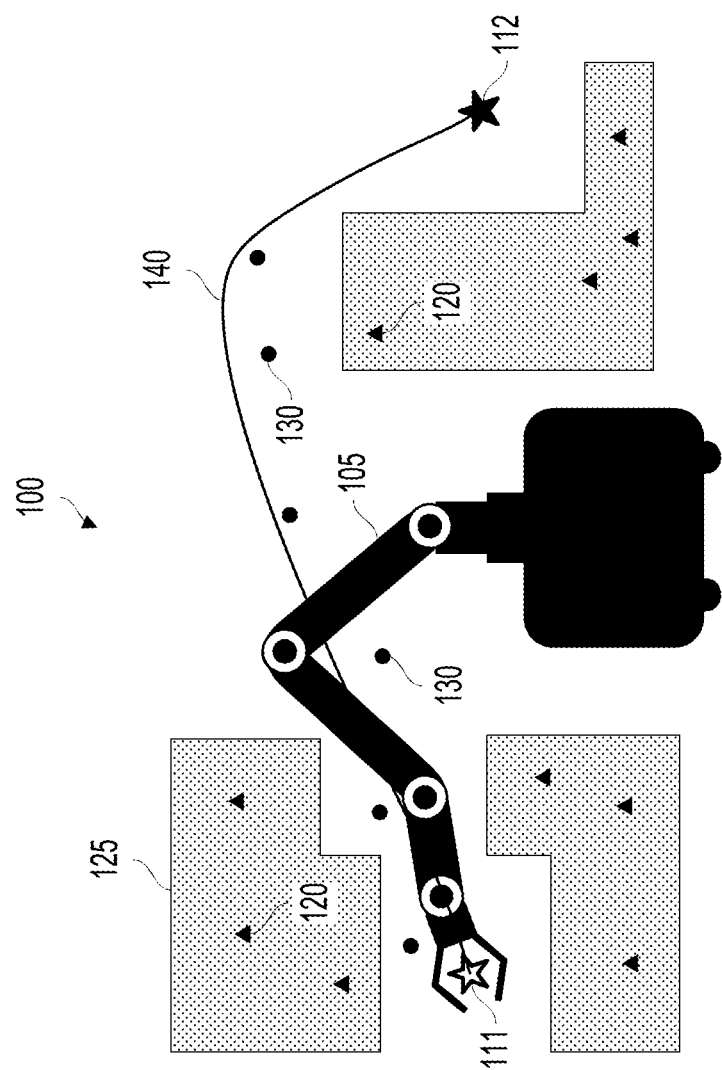
FIG. 1 is a diagram of a robotic system, with a robotic end effector, operable to navigate a path from a starting pose to a goal pose in a sequential box handling process according to an exemplary embodiment of the disclosure.

Refer now to the example embodiment of FIG. 1, which shows a scene 100 wherein a robotic system with an end effector 105 is in a starting pose or starting position 111. The robotic end effector (e.g., robotic arm) travels a path 140 to a goal pose or goal position 112, wherein the path 140 is determined based on a collection of samples in a physical or configuration space of the robotic system. Some samples 120 are identified by a computer system of the robot as invalid because the samples would result in a collision of the robotic end effector with an obstacle 125, for example. Valid samples 130, or adjacent points in the physical or configuration space, that do not, for example, result in collisions with obstacles may comprise the path 140 from the starting position 111 to the goal position 112.

In various embodiments, a computer system of the robot may use a random tree comprising a root node corresponding to the starting pose of the robotic end effector in a physical or configuration space and further comprising child nodes corresponding to valid samples in the physical or configuration space may determine a path 140 of the robotic system. The random tree represents an ensemble of different paths that the robotic end effector may take through the physical or configuration space, as any path in the tree from the root node to a leaf node represents a path of the robotic end effector in physical or configuration space. Paths in the random tree that do not terminate with the robotic end effector in the goal position 112 may be ignored when selecting a path 140 in a sequential handling process. In many embodiments, a generation of a random tree and a selection of a path of the robotic end effector from the tree may require inordinate computation time or more computational resources than may be reasonably available to the robotic end effector. Computational time and resource demand may be especially high in narrow regions wherein the robotic end effector has relatively little space in which to maneuver a box. Furthermore, generation of a new tree, already a computationally intensive, would need to be repeated after each pick and place operation in a sequential process, as each picking of a box represents a unique starting pose and each placing of a box represents a unique goal pose.

In other embodiments, the computer system of the robot may use various machine learning or deep learning methods to determine a distribution of samples in a physical or configuration space, wherein samples are evaluated according to their likelihood of creating a complete path from the starting pose to the goal pose, of maximizing a smoothness of a path of the robotic end effector, of minimizing a distance of a path, of minimizing a cycle time of a path, or of optimizing other path criteria. In some embodiments, a naïve pairing of a random tree method with a machine learning method to learn a distribution of samples may reduce computational time, but may only be feasible in low-dimensional spaces, with convergence for cluttered environments especially difficult. In other embodiments, producing a path directly from a learned sample distribution rather than choosing a path from a large generated random tree may produce a path in less time but may require a large amount of training data and may produce inconsistent results. Furthermore, these methods presume a predetermined starting pose and a predetermined ending pose and do not consider a planning of an order of box handling or a choosing of a box to load or unload.

In many embodiments, a sequential box handling process comprises not only a motion planning or path generation method, but also a method of starting pose and goal pose selection, or equivalently, a method of choosing which box in the arbitrary starting configuration to pick and a method of choosing a target location for the picked box. In some embodiments a structural stability of the arbitrary starting configuration for the boxes to be loaded/unloaded, and of a configuration of boxes after each picking of a box and each placing of a box is assessed by the robot's computer system. In some embodiments, the robot is equipped with a camera and/or other space-sensing device (e.g., lidar) to capture the scene (e.g., the shipping container and stack of boxes to load/unload) and to assess the structural stability of a configuration of boxes. In certain embodiments, the camera and/or other sensing device could be spaced from the robot's computer system and in communication with the computer system via a wired or wireless electronic data link.

Figure 2:
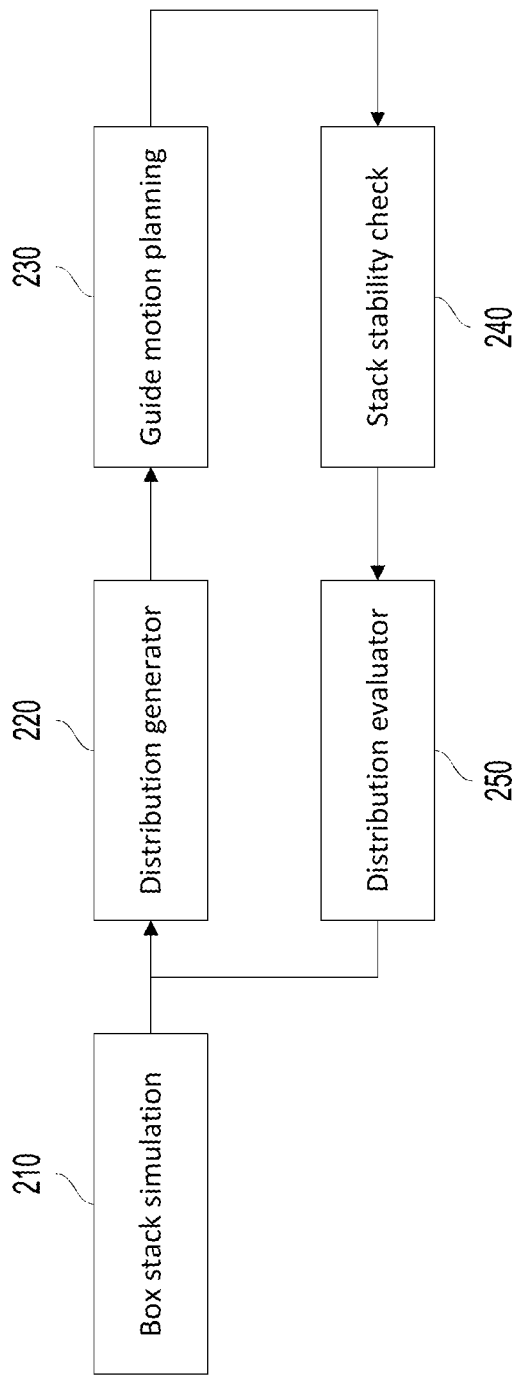
FIG. 2 is a block diagram of a learning embedded motion planning system during a training phase according to an exemplary embodiment of the disclosure.

Refer now to the example embodiment of FIG. 2, which shows a system that trains a model operable to generate paths of the robotic end effector for sequential box handling, to determine a starting pose and a goal pose of the robotic end effector for sequential box handling, and to assess box stability during the sequential handling. The system shown in FIG. 2 may be implemented by an appropriately programmed computer system that does not need to be part of the robot's computer system. That is, the model can be trained off-line and, once trained, installed on the robot's computer system for deployment of the trained model. In particular, the parameters for the trained models can be stored in a memory of the robot. The system comprises a box stack simulation module 210 wherein an ensemble of random box arrangements is generated. A distribution generator module 220 subsequently biases a plurality of samples of a configuration space of the robotic end effector. In many embodiments, the configuration space comprises the degrees of freedom or the full range of motion of the robotic end effector, and in many embodiments, samples of this space may be biased by the distribution generator to avoid collisions with obstacles in an environment. The distribution generator module 220 further chooses a starting pose and a goal pose for the robotic end effector for a single pick and place operation. In some embodiments, the distribution generator module may be a 3D convolutional neural network (CNN), a feed-forward neural network, or other neural network or other machine learning model. In many embodiments, a guided motion planning module 230 utilizes a starting pose, a goal pose, and a biased set of samples in the configuration space to generate a path for the robotic end effector for a single pick and place operation. In some embodiments, the guided motion planning module 230 may utilize tree-based path construction methods, wherein a construction of a tree may be informed by biases assigned to configuration space sample points by the distribution generator module 230. In various embodiments, a stack stability module 240 evaluates a stability of a configuration of boxes after a pick and place operation, assigning a score to the path generated by the guided motion planning module 230. Finally, in various embodiments, a distribution evaluator module 250 evaluates a quality of the distribution of samples of the distribution generator, similarly assigning a score for a generated path. In some embodiments, a distribution evaluator may optimize not only a path of an individual pick and place operation but also may globally optimize an entire sequential box handling process. In various embodiments, the distribution evaluator module 250 may be a 3D CNN, feed-forward neural network, or other neural network or other machine learning model.

Figure 3A:
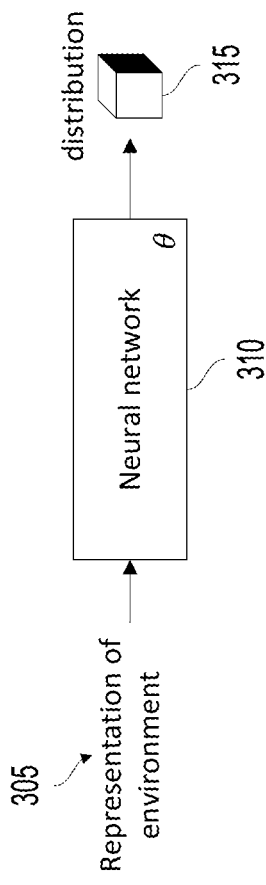
FIG. 3A is a block diagram of a sample distribution generator, comprising a neural network, according to an exemplary embodiment of the disclosure.

Refer now to FIG. 3A, which shows a representation of a distribution generator module, such as the distribution generator module 220 of FIG. 2. In various embodiments, a distribution generator module takes a representation of an environment 305 as an input to a neural network 310. The representation of the environment may be a 3D voxel grid or other 3D representation. The neural network 310 produces a distribution over sample points, assigning a probability, between 0 and 1, to each point, with, for example, greater values (i.e., near 1) indicating preferred sample points. In most embodiments, a probability of 1 assigned to a sample point by the distribution generator ensures that a generated path will pass through that point.

Figure 3B:
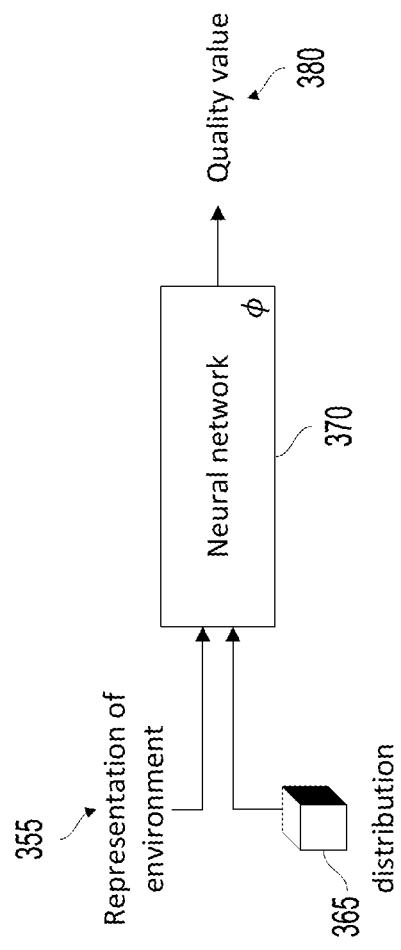
FIG. 3B is a block diagram of a sample distribution evaluator, comprising a neural network, according to an exemplary embodiment of the disclosure.

Refer now to FIG. 3B, which shows a representation of a distribution evaluator module, such as the distribution evaluator module 250 of FIG. 2. In various embodiments, a distribution evaluator module takes a representation of an environment 355 and a distribution 365 of sample points, such as the distribution 315 generated by the distribution generator of FIG. 3B, as an inputs to a neural network 370. In many embodiments, the neural network 370 produces as an output a quality score 380 of the distribution 365 such that potential paths generated are likely to produce a minimum average cycle time and such that an average stability of boxes after successive pick an place operations is maximized. In other embodiments, other criteria may be optimized by the quality score 380.

Figure 4B:
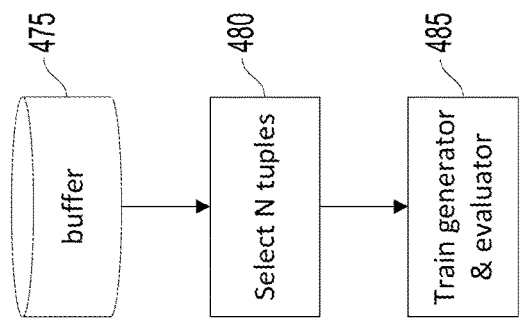
FIG. 4B is a block diagram of a method of training a sample distribution generator and a sample distribution evaluator according to an exemplary embodiment of the disclosure.
Figure 4A:
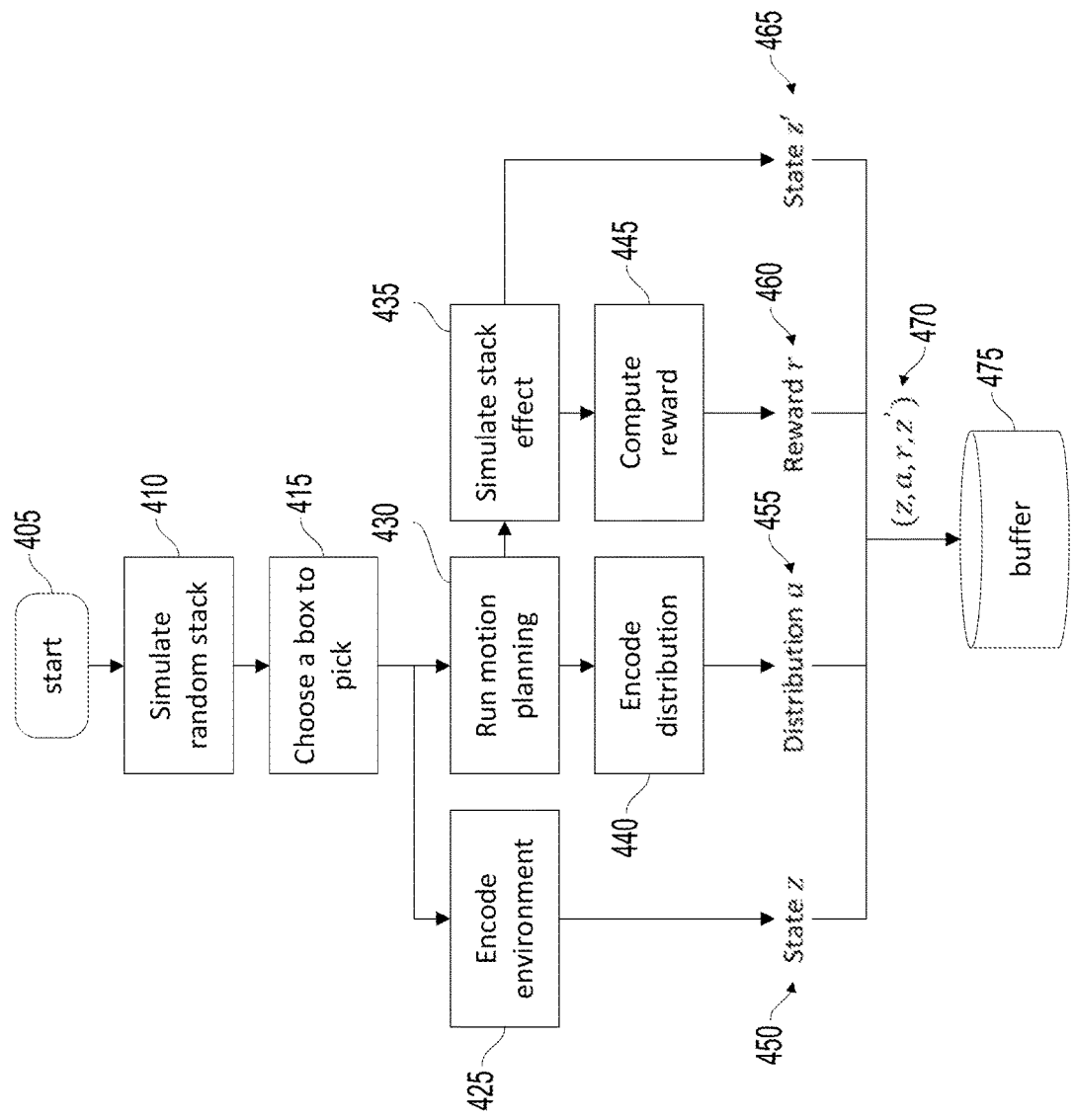
FIG. 4A is a block diagram of a system for generating training data for a sample distribution generator and a sample distribution evaluator according to an exemplary embodiment of the disclosure.

Refer now to FIG. 4A, which represents a method of training the neural networks 310, 370 of FIGS. 3A and 3B. In FIG. 4A, the method starts 405 with a simulation of a random box stack 410. In many embodiments, a box is chosen 415 from the randomly generated box stack. A complete encoding of the environment, comprising obstacles and the loading and unloading areas, is generated 425, annotated as a state z 450. In most embodiments, after choosing 415 a box to pick, a sample-based motion planning routine 430 is also initiated. In the sample-based motion planning routine, a distribution a 455 of samples of the configuration space of the robotic end effector is encoded 440. A physics-based simulation 435 assesses an effect of picking the chosen box on a remaining stack of boxes, computing 445 a reward r 460. In some embodiments, the reward 460 may be based on a cycle time of a computed path, a smoothness of the computed path, or other criteria. Finally, the remaining stack of boxes may be encoded as a new state z' 465. In various embodiments, the states z 450 and z' 465 may be 3D voxel grids or point clouds. Furthermore, the state z 450, the distribution a 455, the reward r 460, and the new state z' 465 comprise a tuple (z, a, r, z') 470, defined for a specific chosen box in a particular randomly generated box stack. In many embodiments, the tuple 470 is stored in a buffer 475. In most embodiments, a new box may be chosen 415 and subsequent steps repeated to produce a new tuple, appended to the buffer 475. Furthermore, in many embodiments, a new stack of boxes may be simulated 410, wherein new boxes are selected 415 generating a plurality of tuples (z, a, r, z') appended to the buffer 475. The plurality of tuples stored in the buffer comprises training data for the distribution generator and distribution evaluator neural networks.

Refer now to the example embodiment of FIG. 4B. In many embodiments of the disclosure, the distribution generator and distribution evaluator neural networks are trained in tandem, in a reciprocating fashion. To train the networks, a subset of N tuples 480 is chosen from the buffer 475. In most embodiments, the distribution generator neural network is trained according to $$\theta^* \leftarrow \arg\max_\theta \sum C_{\bar{\phi}}(z, A_\theta(z))$$

while the distribution evaluator is trained according to $$\phi^* = \arg\min_\phi \sum \left\| C_{\bar{\phi}}(z, a) - (r + C_\phi(z', A_{\bar{\theta}}(z'))) \right\|^2.$$

In the equations above, z 450 is the state before choosing a box, z' 465 is the state after choosing a box, r is a one-step reward, and a is a distribution. Furthermore, Ae is a distribution generator that is actively trained, while Ag is a version delayed in its training by a constant of iteration and used in training the distribution evaluator. Similarly, $C_\phi$ is a "critique" or distribution evaluator that is actively trained, while $C_{\bar{\phi}}$ is a version delayed in its training by a constant of iteration and used in training the distribution generator. Delayed versions of the distribution generator and distribution evaluator, $A_{\bar{\theta}}$ and $C_{\bar{\phi}}$ respectively, exist for the purpose of stability and convergence in the training and will be familiar to a practitioner with ordinary skill in the art. The distribution evaluator training minimizes a norm of a difference of a first reward $C_\phi(z', A_{\bar{\theta}}(z'))$+r and a second reward $C_{\bar{\phi}}(z, a)$. The first reward represents an accumulated reward in a next state z' plus the one-step reward r while the second reward represents an accumulated reward in a current state z. In many embodiments, training of the distribution generator and the distribution evaluator takes place before a deployment of the robotic system, before any sequential box handling process is performed.

Figure 5:
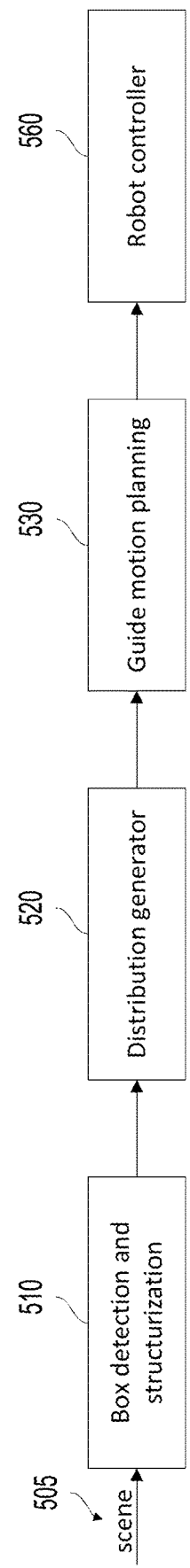
FIGS. 5 and 8 are block diagrams of a learning embedded motion planning system operating in a production mode, after a sample distribution generator and a sample distribution evaluator have been trained, according to an exemplary embodiment of the disclosure.
Figure 8:
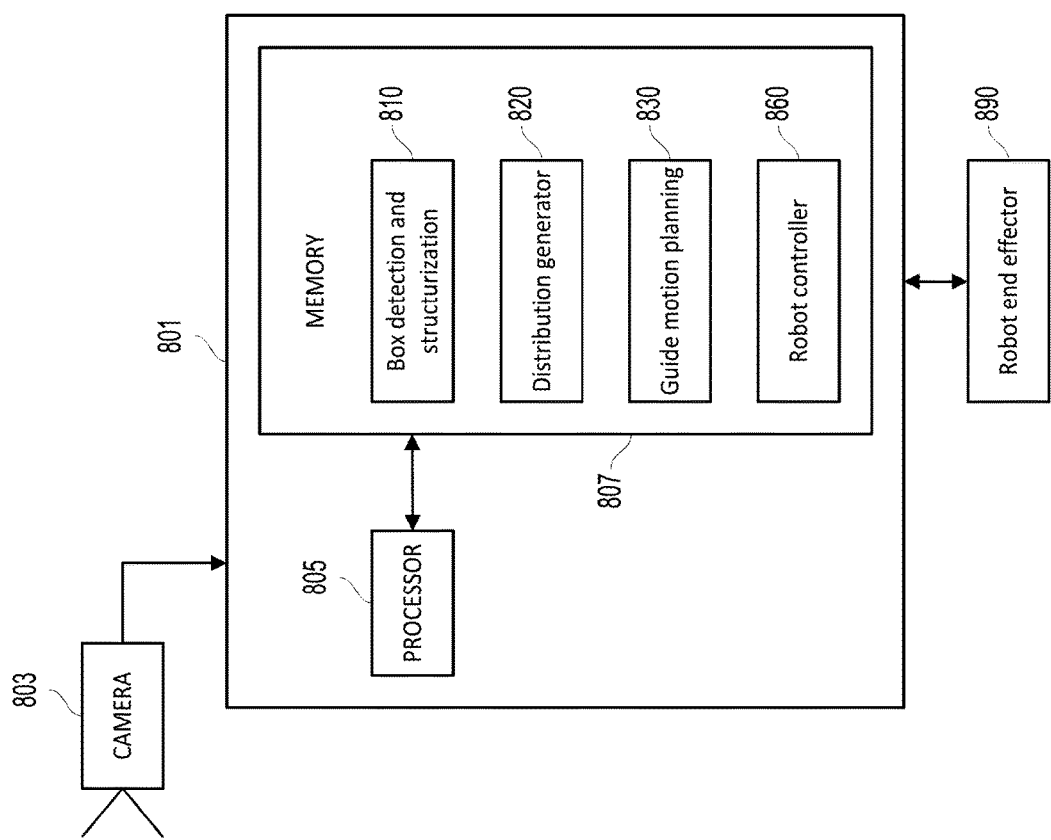

Refer now to the example embodiment of FIGS. 5 and 8, which collectively show the robot implementing a method of generating paths for the robotic end effector for sequential box handling. Once the models are trained (e.g., trained off-line), the models and parameters can be loaded into a memory 513 of the computer system 503 of the robot so that the robot can deploy the trained models to determine the paths when loading/unloading boxes. In many embodiments, the method starts with a representation 505 of the scene or environment captured by a camera system 503 and/or other sensing system. A box detection and structurization module 510 of the computer system detects the boxes and their structure (e.g., stack configuration) based on the camera image 505 or other representation of the box stack or surrounding environment. In various embodiments, boxes are detected based on the representation of the box stack, and this environment is encoded analogous to the state z of FIG. 4A. In many embodiments, the encoded environment is an input to a distribution generator 520, wherein the distribution generator has been trained according to the methods of FIGS. 4A and 4B. The distribution generator 520 produces a distribution of samples, biased according to the training of the generator. In many embodiments, a guided motion planning process 530 generates a path for a pick and place operation according to the distribution of samples. In many embodiments, the biased distribution of samples also includes information on a starting pose and a goal pose, i.e. a box to pick or place. Finally, the generated path is sent to the robot controller 560, which controls the robotic end effector 105 according to the determined path. In many embodiments, the method of FIG. 5 is performed by a deployed robotic system after the distribution generator and the distribution evaluator have been trained.

The robot computer system 505 may comprise one or more processors 511 and one or more computer memories 513. One processor 511 and one memory 513 are show in FIG. 8 for convenience. Each processor unit 511 may comprise onboard memory (ROM or RAM) and off-board memory. The onboard memory may comprise primary, volatile, and/or non-volatile storage (e.g., storage directly accessible by the processor cores 511). The off-board memory 513 may comprise secondary, non-volatile storage (e.g., storage that is not directly accessible by the processor cores 511), such as ROM, HDDs, SSD, flash, etc. The processor cores 511 may be CPU cores, GPU cores and/or AI accelerator cores, for example. The software for the various software modules 510, 520, 530, 560 described herein and other computer functions described herein may be implemented in computer software using any suitable computer programming language, such as .NET, C, C++, or Python, and using conventional, functional, or object-oriented techniques. For example, the software modules 510, 520, 530, 560 may be stored or otherwise maintained in computer readable media, e.g., RAM, ROM, secondary storage 513, etc. One or more processing cores 511 may then execute the software modules to implement the function of the respective module. Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl.

Figure 6:
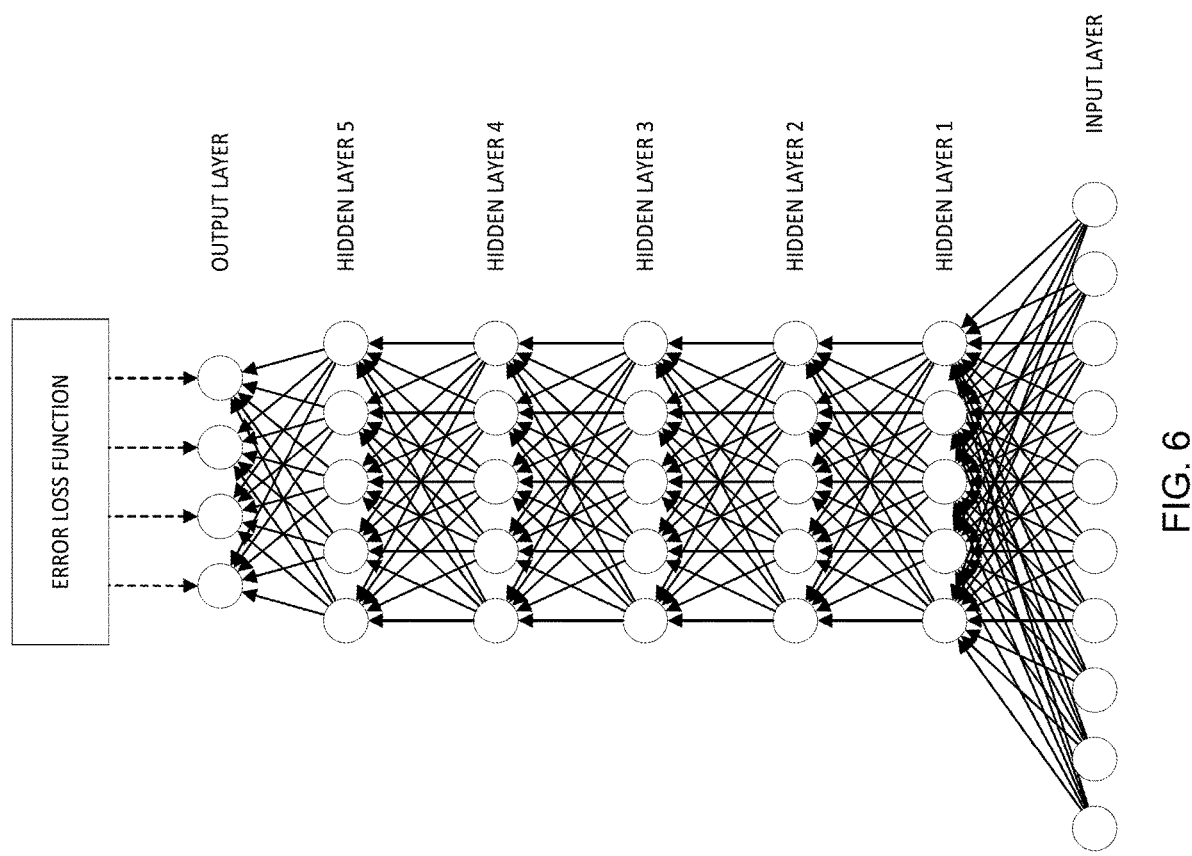
FIG. 6 is a diagram of a feed-forward neural network according to an exemplary embodiment of the disclosure.

The machine-learning modules described herein may comprise neural networks. FIG. 6 depicts an example of a feed forward neural network, such as the neural network used in a distribution generator or a distribution evaluator. In this discussion, a neural network comprises a network of nodes organized into layers: a layer of input nodes, zero or more inner layers of nodes, and a layer of output nodes. There is an input node associated with each input variable and an output node associated with each output variable. An inner layer may also be called a hidden layer. A given node in the output layer or in an inner layer is connected to one or more nodes in lower layers by means of a directed arc from the node in the lower layer to the given higher layer node. A directed arc may be associated with a trainable parameter, called its weight, which represents the strength of the connection from the lower node to the given higher node. A trainable parameter is also called a "learned" parameter. Each node is also associated with an additional learned parameter called its "bias." Other parameters that control the learning process are called "hyperparameters." The neural network illustrated in FIG. 22 has an input layer, an output layer, and three hidden layers.

A conventional neural network node is essentially a computational unit. In the context of a typical neural network layer, each node performs two main operations: an affine transformation and an activation function. The affine transformation involves taking a weighted sum of the input values along with their respective weights and adding a bias term. After the affine transformation, the node applies an activation function, which introduces non-linearity to the output. Common activation functions include ReLU (Rectified Linear Unit), sigmoid, tanh, etc. This function helps the network learn complex patterns and relationships within the data. Together, these operations enable each node to process incoming information and produce an output that is then fed into the next layer of the neural network.

A neural network, such as shown in FIG. 6, is typically trained via gradient descent. Training a neural network by gradient descent involves adjusting the networks parameters to minimize a chosen loss function. Backpropagation, a key step in this process, computes the gradient of the loss function with respect to each parameter using the chain rule of calculus. In a forward pass, during training, input data propagates forward through the network layer by layer. Each layer performs computations using its weights, biases, and activation functions to generate an output. Then, the output of the neural network is compared to the actual target values using a loss function, which measures the network's performance. Common loss functions include mean squared error or cross-entropy, depending on the problem. Then, a backward pass or "backpropagation" phase is undertaken. After calculating the loss, the network works backward to compute the gradient of the loss function with respect to each parameter in the network. This is done using the chain rule to calculate how much each parameter contributed to the overall error. This process involves computing partial derivatives at each layer while moving backward through the network. The chain rule allows for the calculation of how much each parameter affects the final error. Derivatives indicate the rate of change of a function concerning its variables. In this case, they show how much the loss function changes concerning small changes in the network's parameters. These derivatives are fundamental in guiding the updates made to the parameters during the gradient descent process. By adjusting parameters in the direction opposite to the gradient, the network aims to minimize the loss, thus improving its performance. With the gradients known, the network parameters can be updated in the opposite direction of the gradient to minimize the loss function. This step involves multiplying the gradients by a learning rate (a hyperparameters that controls the size of the update) and subtracting this from the current parameter values. These steps can be repeated for multiple epochs or iterations until the network converges to a state where the loss is minimized, or until a stopping criterion is met.

Figure 7:
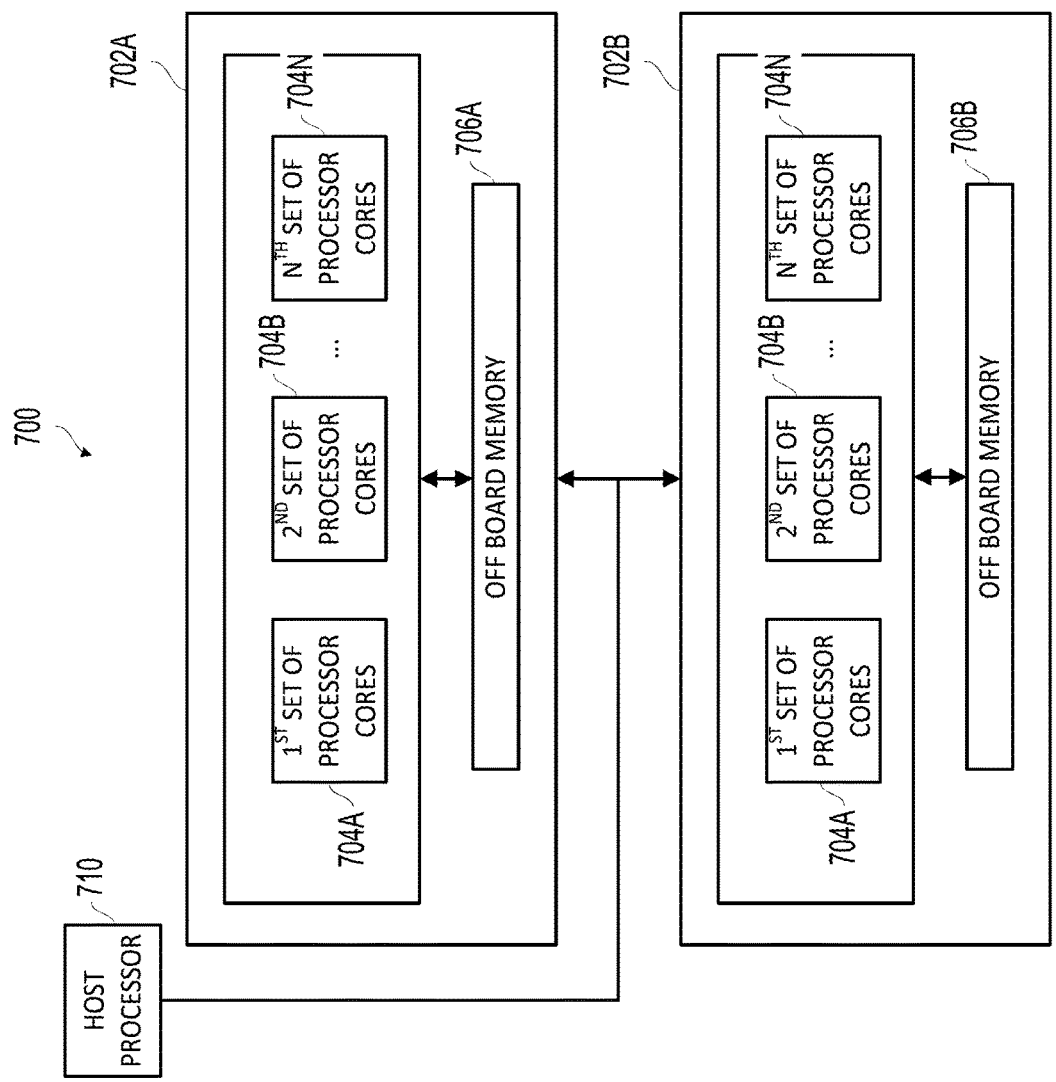
FIG. 7 is a block diagram of a hardware system operable to train or evaluate neural networks according to an exemplary embodiment of the disclosure.

Refer now to FIG. 7, a diagram of a computer system 700 that could be used to train the neural networks described above. The illustrated computer system 700 comprises multiple processor units 702A-B that each comprises, in the illustrated embodiment, multiple (N) sets of processor cores 704A-N. Each processor unit 702A-B may comprise on-board memory (ROM or RAM) (not shown) and off-board memory 706A. The on-board memory may comprise primary, volatile and/or non-volatile, storage (e.g., storage directly accessible by the processor cores 704A-N). The off-board memory 706A-B may comprise secondary, non-volatile storage (e.g., storage that is not directly accessible by the processor cores 704A-N), such as ROM, HDDs, SSD, flash, etc. The processor cores 704A-N may be CPU cores, GPU cores and/or AI accelerator cores. GPU cores operate in parallel (e.g., a general-purpose GPU (GPGPU) pipeline) and, hence, can typically process data more efficiently that a collection of CPU cores, but all the cores of a GPU execute the same code at one time. AI accelerators are a class of microprocessor designed to accelerate artificial neural networks. They typically are employed as a co-processor in a device with a host CPU 710 as well. An AI accelerator typically has tens of thousands of matrix multiplier units that operate at lower precision than a CPU core, such as 8-bit precision in an AI accelerator versus 64-bit precision in a CPU core.

In various embodiments, the training processes and distribution generation and distribution evaluation depicted in various figures can be embodied as a set of instructions stored within a memory (e.g., an integral memory of the processing units 702A, 702B or an off board memory 706A couple to the processing units 702A, 702B or other processing units) coupled to one or more processors (e.g., at least one of the sets of processor cores 704A-N of the processing units 702A, 702B or another processor(s) communicatively coupled to the processing units 702A, 702B), such that, when executed by the one or more processors, the instructions cause the processors to perform the aforementioned processes by, for example, controlling machine learning systems stored in the processing units 702A, 702B.

In other embodiments, the computer system 700 could be implemented with one processor unit. In embodiments where there are multiple processor units, the processor units could be co-located or distributed. For example, the processor units may be interconnected by data networks, such as a LAN, WAN, the Internet, etc., using suitable wired and/or wireless data communication links. Data may be shared between the various processing units using suitable data links, such as data buses (preferably high-speed data buses) or network links (e.g., Ethernet).

Refer now to the example embodiment of FIG. 8, which shows a computer system operable to evaluate a trained neural network and to plan paths of a robotic effector in a sequential box handling operation. The computer system 801 is equipped with a camera 803 to image an environment. The computer system 801 comprises a processor 805 and various modules 807 of a learning embedded motion planning system. The various modules may comprise at least one neural network or other computational operations evaluated or executed by the processor 805. The various modules 807 comprise a box detection and structurization module 810 that detects boxes in an otherwise unstructured (e.g. point cloud) representation of an environment. The various modules 807 further comprise a distribution generator 820 that generates a biased distribution of samples in the configuration space of the robotic system, wherein samples are biased toward representing a particular starting pose and a particular goal pose and any points in the configuration space which are likely to produce a successful path from the starting pose to the goal pose, possibly optimized for path criteria such as smoothness. The various modules 807 further comprise a guided motion planning module 830, which generates a path from the biased distribution of samples. Finally, in most embodiments, the various modules 807 further comprise a robot controller 860 that may convert the planned path into instructions for the robotic system. In most embodiments, the planned path is performed by a robot end effector 890.

The software for the various computer systems described herein and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, CUDA® (CUDA), Fortran, JAVA® (Java), Lisp, Pascal, Object Pascal, Haskell, ML; and examples of scripting languages include Bourne script, JAVASCRIPT®, PYTHON®, Ruby, LAU® (Lua), PHP, and PERL® (Perl).

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

What is claimed is:

1. A method of sequential handling of a plurality of freight units by an end effector of a robotic system, the method comprising:

training, by a programmed computer system, at least one neural network operable to bias a plurality of samples of a configuration space of the end effector; and after training of the at least one neural network, deploying the neural network, wherein deploying the at least one neural network comprises:
- sensing, by a computer system of the robotic system, an arrangement of freight units in a scene based on an image of the scene from a sensor;
- choosing, by the computer system of the robotic system, a freight unit based on the at least one trained neural network;
- choosing, by the computer system of the robotic system, a starting pose of the robotic end effector as a means to pick the chosen freight unit;
- choosing, by the computer system of the robotic system, a goal pose of the robotic end effector as a means to place the chosen freight unit;
- planning, by the computer system of the robotic system, a motion of the robotic end effector from the starting pose to the goal pose based on a biased plurality of samples; and
- controlling, by the computer system of the robotic system, the motion on the end effector based on the planning.

2. The method of claim 1, wherein the end effector comprises a robotic arm and the robotic system further comprises a mobile base.

3. The method of claim 1, wherein the sensor of the robotic system comprises a camera.

4. The method of claim 1, wherein the neural network comprises a feed-forward neural network.

5. The method of claim 1, wherein the neural network comprises a 3D convolutional neural network.

6. The method of claim 1, wherein the training of the neural network comprises:
- simulating a random arrangement of freight units;
- choosing a random freight unit to handle;
- generating a plurality of samples of a configuration space of the robotic end effector;
- measuring a stability of the random arrangement of freight units; and assigning a bias to each of the plurality of samples of a configuration space of the robotic end effector to minimize a cycle time of a path through the samples.

7. The method of claim 6, further comprising assigning, by the programmed computer system, a bias to each of the plurality of samples of a configuration space of the end effector to maximize a smoothness of a path through the samples.

8. The method of claim 6, wherein the path is selected from a random tree of the samples.

9. A system of sequential handling of a plurality of freight units by an end effector of a robotic system, the system comprising:
- a first computer system for training a neural network operable to bias a plurality of samples of a configuration space of the end effector; and
- the robotic system comprising a sensor, a robot computer system, and the end effector, wherein:
  - the sensor is for capturing an image of freight units in a scene; and
  - the robot computer system is configured to:
    - sense an arrangement of the freight units in the scene based on the image;
    - choose a freight unit based on the trained neural network;
    - choose a starting pose of the robotic end effector as a means to pick the chosen freight unit;
    - choose a goal pose of the robotic end effector as a means to place the chosen freight unit;
    - plan a motion of the end effector from the starting pose to the goal pose; and
    - control the motion on the robotic end effector based on the planning.

10. The system of claim 9, wherein the end effector comprises a robotic arm.

11. The system of claim 9, wherein the sensor of the robotic system comprises a camera.

12. The system of claim 9, wherein the neural network comprises a feed-forward neural network.

13. The system of claim 9, wherein the neural network comprises a 3D convolutional neural network.

14. The system of claim 9, wherein the first computer system is for training the neural network by:
- simulating a random arrangement of freight units;
- choosing a random freight unit to handle;
- generating a plurality of samples of a configuration space of the robotic end effector; and
- measuring a stability of the random arrangement of freight units; and assigning a bias to each of the plurality of samples of a configuration space of the robotic end effector to minimize a cycle time of a path through the samples.

15. The system of claim 14, wherein the first computer system is further configured to assign a bias to each of the plurality of samples of a configuration space of the end effector to maximize a smoothness of a path through the samples.

16. The system of claim 14, wherein the path is selected from a random tree of the samples.

* * * * *

UNITED STATES PATENT AND TRADEMARK OFFICE
CERTIFICATE OF CORRECTION

| | | |
|---|---|---|
| PATENT NO. | : 12,440,983 B1 | Page 1 of 1 |
| APPLICATION NO. | : 18/429763 | |
| DATED | : October 14, 2025 | |
| INVENTOR(S) | : Yongxiang Fan, Te Tang and Yiyang Zhou | |

It is certified that error appears in the above-identified patent and that said Letters Patent is hereby corrected as shown below:

On the Title Page

Item (60) Related U.S. Application Data, should read:
Provisional application No. 63/430,042, filed Dec. 4, 2022.

Signed and Sealed this
Twenty-fifth Day of November, 2025

John A. Squires
*Director of the United States Patent and Trademark Office*